United States Patent [19]

Herbst

[11] Patent Number: 4,702,703

[45] Date of Patent: Oct. 27, 1987

[54] DEVICES FOR AIDING ASTRONOMERS TO LOCATE STARS AND OTHER CELESTIAL BODIES

[76] Inventor: Robert R. Herbst, 17649 Adena La., San Diego, Calif. 92128

[21] Appl. No.: 812,966

[22] Filed: Dec. 24, 1985

[51] Int. Cl.⁴ ............................................. G09B 27/06
[52] U.S. Cl. ...................... 434/289; 434/287
[58] Field of Search ............... 434/287, 289, 288, 284, 434/285, 286

[56] References Cited

U.S. PATENT DOCUMENTS

| | | | |
|---|---|---|---|
| 949,348 | 2/1910 | Baker | 434/287 |
| 1,853,059 | 4/1932 | Johnson | 434/287 |
| 2,515,401 | 7/1950 | Dupler | 434/288 |

OTHER PUBLICATIONS

Popular Science, Jan. 1944, p. 91, ("By Peering ... ").
Farquhar, "Earth in Space", Globe, 2 pages.

*Primary Examiner*—William H. Grieb
*Attorney, Agent, or Firm*—Laff, Whitesel, Conte & Saret

[57] ABSTRACT

A hollow transparent sphere has light reflecting spots formed on its surface in positions corresponding to the actual locations of stars in the night sky. The sphere is illuminated from within so that a viewer looking through the globe sees the spots in the same relative locations as stars in the background sky behind the globe. An equatorial band may be marked to correspond to nearby landmarks as an aid to an orientation of the globe.

10 Claims, 4 Drawing Figures

U.S. Patent  Oct. 27, 1987  4,702,703
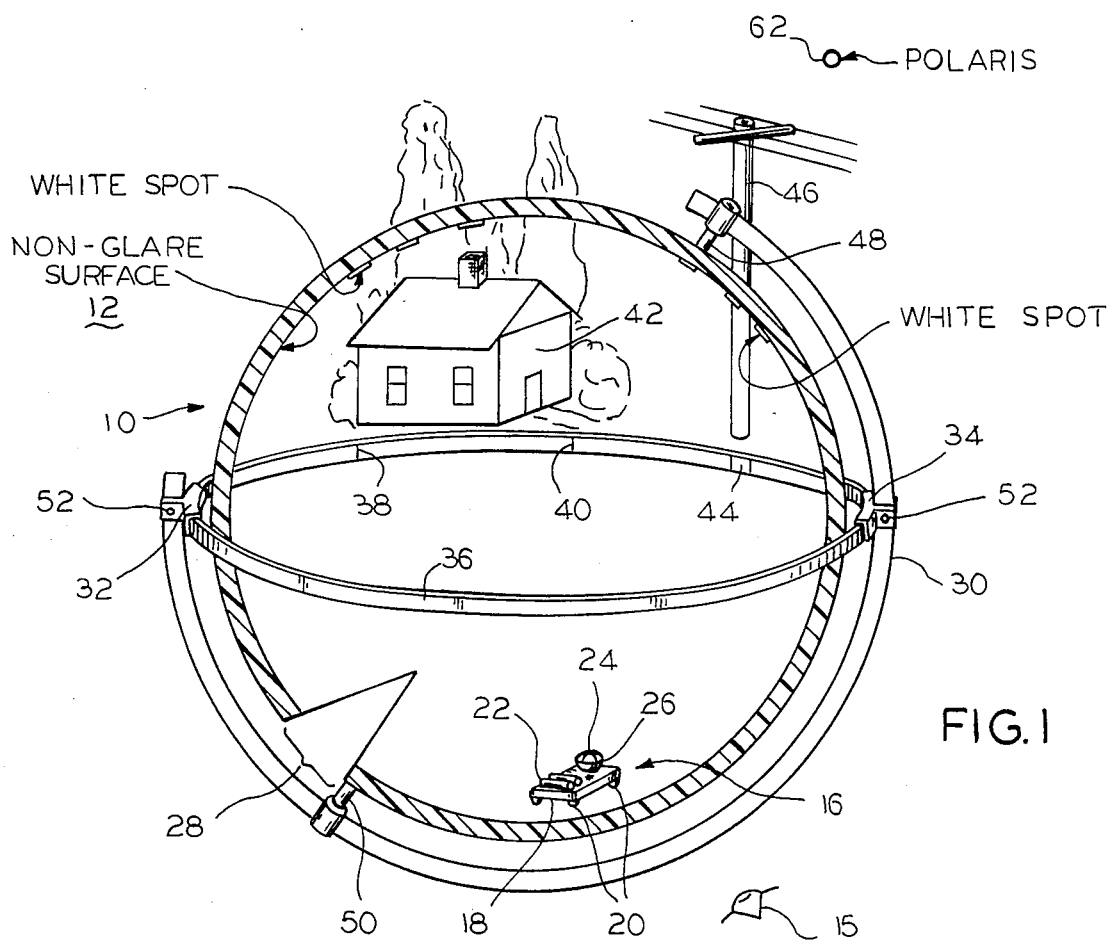
FIG. 1
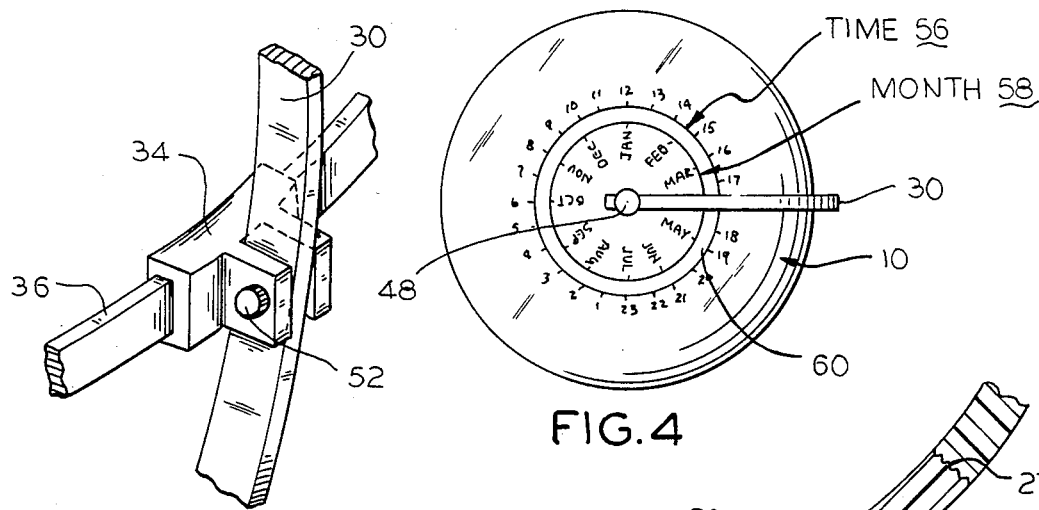
FIG. 2
FIG. 4
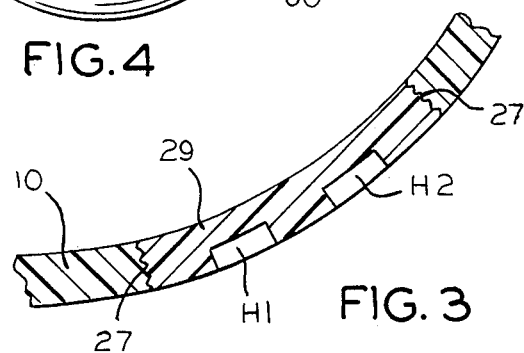
FIG. 3

DEVICES FOR AIDING ASTRONOMERS TO LOCATE STARS AND OTHER CELESTIAL BODIES

This invention relates to devices for aiding astronomers—especially amateur astronomers—and more particularly to devices for locating and illustrating the relative positions of the stars and other celestial bodies as they actually appear in the night sky.

The celestial sphere is an imaginary hollow ball with the earth at its center. When one looks up at the stars, it is as if one were looking up at the inner surface of a large dome, or the top half of a sphere. A star or other celestial body appears in the sky as if it were a spot on the inner surface of the celestial sphere.

The position of a star on this sphere is given in terms of right ascension hours and minutes. A star's declination angle is the angle formed at a particular spot on the earth by two lines, one being the parallel celestial equator and the other passing through the star. The declination angle of any point on the surface of the earth corresponds to that point's latitude. Thus, for example, in Chicago the declination angle of polaris is approximately 42°, in San Diego, approximately 33°.

Generally globes, maps and charts are available which plot the stars and other celestial bodies. Most of these structures require the user to shift his gaze back and forth between the sky and the globe, map, or chart. Moreover, as with geographical maps, the charts and maps usually depict the sky as a flat surface and thus distort the true picture of the stars in relation to the earth. When used at night, the globe, map or chart has to be lit while the sky is dark which means that the eye has to have time enough to accommodate itself each time that it shifts back and forth.

Globes accurately depict the celestial sphere; however, those which are similar to terrestrial globes depict the stars on the outer surface of the globe, while we see the real sky from the inside of the celestial globe. Thus, there may be an orientation problem when a conventional globe is used as a star locator.

Accordingly, an object of the invention is to provide new and improved devices for aiding astronomers to locate stars and other celestial bodies. Here, an object is to aid the novice astronomer in locating and identifying the stars, constellations and other celestial bodies in the night sky.

Another object of the invention is to quickly and accurately locate such stars without requiring a use of mathematical formulas, computations, or the like.

Still, another object of this invention is to provide an accurate chart of the night sky as it appears to the novice astronomer at any spot on the surface of the earth and on any night, without the distortion of the true picture that invariably accompanies the use of celestial maps and charts printed on flat surfaces.

Yet another object of this invention is to enable the novice astronomer to become oriented to his respective position on the surface of the earth and particularly with respect to his familiar surroundings.

In keeping with an aspect of this invention, a transparent, hollow celestial globe has an inner surface, which may be viewed by looking through the globe. The inner surface is dotted with light reflecting spots at precise locations which correspond to the objects in celestial the sky. When these reflective spots are illuminated by an upwardly directed inner light source positioned inside the bottom half of the globe, they appear to light up and resemble the stars, constellations and other celestial objects as they acutally appear to a stargazer at night. There is no problem of shifting ones gaze because if the globe is held in the correct position the spots are juxtaposed by the actual stars that they represent. There is no orientation problem of looking down and seeing things in one position and then looking up and seeing them in a different relationship. The inner surface of the globe is illuminated from within by a removable light source mounted on a platform with rollers which enable the platform to move so that it always remains at the bottom of the sphere. At the top of the globe are one or more setting circles which depict degrees, hours, or dates so that the globe position can be adjusted to accurately reflect the time and date of observation.

The above mentioned and other objects of this invention will be best understood by reference to the following description of an embodiment of the invention taken in conjunction with the accompanying drawings, in which:

FIG. 1 is a perspective view of the celestial globe with a background landscape which might be seen by a viewer, as he used the globe in his back yard, for example;

FIG. 2 is a perspective view of a clamp which secures a horizon position finder onto the globe;

FIG. 3 is a cross-section of the globe showing a port which may be opened or closed to install or remove the lighted platform; and FIG. 4 is a top view of setting circles for orienting the globe for date and time.

DETAILED DESCRIPTION

A hollow sphere 10 is made of a transparent material, such as an acrylic plastic, to represent a celestial globe. Preferably, the inner surface 12 has a non-glare characteristic which will preclude bright spots when the inside top of the illuminated globe is viewed through the globe itself. A number of light reflective spots 14 are formed to be visible, as if they were formed on the inner surface 12 when viewed from below the globe at a position indicated by the eye 15. These spots 14 represent stars, constellations and other celestial objects which are visible in the night sky. Depending upon the expense which may be incurred to construct the globe, the spots may be formed by many things ranging from photographs of the actual stars to a silk-screened image. They may be simple paint or a flourescent material, for example.

The spots 14 are illuminated from within the globe by a removable light source 16 which is mounted on a platform 18 supported by rollers 20. A battery pack 22 and an upwardly directed light bulb 24 are mounted on the platform 18. A reflector 26 surrounds the light bulb to keep the light out of the eyes of the viewer. The rollers 20 enable the light source 16 to move freely throughout the globe responsive to the movement of the globe, always placing light source 16 in the bottom of the globe and illuminating the upper portion of the globe. When illuminated, the spots 14 appear as points of light which resemble stars in the night sky. Thus, the user of the globe can look through the transparent globe at a representation of the sky which simulates the actual stars and constellations seen in the sky behind the globe.

The removable light source 16 may be inserted into the globe by means of a hole or other opening 28. Preferably this opening should be no greater than a 30° arc on the surface of the globe. Thus, light source 16 may be removed from the globe and the light switched on. Then this source is returned into the globe. After the globe is used, the light source is removed, switched off, and returned to the globe.

An alternative to a simple opening 28 in the globe 10 is seen in FIG. 3. The globe 10 has a port with screw threads 27 formed therein. A threaded screw cap 29 fits into this port to complete the surface of the globe. To enable the cap 29 to be removed from the globe, the user may place his thumb and index finger in the holes H1, H2. An alternative is to provide a slot which would receive a coin that could be used as a screw driver. In any event, the cap 29 is removed, the light source 16 is removed and lit or switched off, and than returned to the globe. Thereafter, the cap 29 is returned to the closed position.

Rotatably attached to the globe at two opposite poles is a ring 30 made of metal, plastic or other suitable material which enables two clamps 32, 34 to be secured at selected places in order to establish an equator. A band 36 of markable material such as heavy paper, for example, entirely encircles the circumference of the globe 10 at the equator thereof, passing through the clamps 32, 34. The user of the globe 10 may mark band 36 according to the positions of landmarks which are familiar to him. For example, marks 38, 40 may be placed on band 36 in alignment with the sides of a house 42. A mark 44 may be placed on band 36 in alignment with a telephone pole 46. If the user goes to some other location, he replaces band 36 with a fresh band, which is marked accordingly to any suitable landmarks at the new location. When the ring 36 is lined up with the user's horizon and the sketched landmark indicators 38, 40, 41 are lined up with the actual landmarks 42, 46 the sphere is horizontally oriented for the user's observing area.

The ring 30, which supports clamps 32, 34, is an arcuate band running perpendicular to the equitorial ring 36. At the northern and southern poles of the globe, the ring 30 is affixed to the globe by protruding axes 48, 50. The imaginary line through axes 48, 50 should point to the North Star or Polaris.

The clamps 32, 34 (FIG. 2) securing the band 36 can be moved on ring 30 to any suitable position representing the latitude of the user. A scale is provided on ring 30 to facilitate this setting. There, the clamp is tightened into position by means of a thumb screw 52, thereby securing the band 36 through the clamps 32, 34 to the ring 30 in the same relative position as the equator of the earth. Thus, by loosening and repositioning the clamps, the angle of the sphere's polar axis 46 can be adjusted to conform to an angle representing the user's latitude. Depending upon the latitude of the user of the sphere, the angle will be set to a degree representing the angle between a line to Polaris and the horizon at the latitude of the user.

Means are provided for adjusting the globe's position relative to the date and hour when the observation occurs. In greater detail, there are two setting circles 56, 58, one is engraved on the top of the globe and the other is engraved on a disc rigidly attached to the ring 30 at the axis 48. In this particular example, the 24-hours of a single day are represented in the setting circle 56 which is engraved on the top of the globe. The twelve months of the year are engraved in the setting circle 58 rigidly attached to ring 30. Thus, as shown in FIG. 4 by way of example, the setting might be appropriate for 1900 hours on the first day of May (see the reading at 60). The user is instructed to hold the globe in a position where the ring 30 is on the bottom of the globe, which will establish the rotary position of the globe relative to the surface of the earth.

In operation, the light source 16 is switched on and placed in the globe via opening 28. The polar axis 48, 50 of the globe is first set to the user's latitude by a selection of the proper declination angle by the movement of clamps 32, 34 to degrée marks printed or stamped on ring 30. For example, in Chicago, the clamps would be set at about 42° while in the San Diego area they would be set to about 33°. After the appropriate angle is set, the globe setting circle or circles 56, 58 (FIG. 4) are set to reflect the time and date of observation. With the ring 36 aligned with the user's horizon, and with the polar axis 48, 50 on the globe aligned with polaris 62, the user marks points 38, 40 and 44 on band 36 with respect to nearby landmarks.

The inner surface of the globe is now illuminated by the light source 16 and the light reflecting spots 14 represent an accurate map of the night sky. A stargazer, whose eye 15 is looking through the globe is able to locate and identify particular celestial bodies by looking past the appropriate spot 14 to the actual star which is represents. The identification of the celestial objects may also be noted on the surface of the sphere.

Those who are skilled in the art will readily perceive how to modify the invention. Therefore, the appended claims are to be construed to cover all equivalent structures which fall within the true scope and spirit of the invention.

I claim:

1. A hollow transparent sphere, having spots dispersed over the surface of the sphere, said spots being arranged on said surface to depict stars and constellations at the positions which they actually occupy in the sky; means inside said sphere for illuminating the surface of the sphere, said illuminating means being a removable, battery powered light source having supporting rollers so that said illuminating means rolls under gravity to the lowest point on the sphere, said spots reflecting the light of said illuminating means; and a ring encircling at least part of the circumference of the sphere, said ring being secured to the sphere at its north and south poles and a band perpendicular to the ring and encircling the sphere at a location corresponding to the earth's equator to provide a surface which may be marked with orienting indicia.

2. The hollow sphere of claim 7 and one or more setting circles depicting degrees, time or on the sphere and the ring at a pole of the sphere.

3. The hollow sphere of claim 7 wherein the transparent sphere has an inner surface with a non-glare characteristic.

4. The hollow sphere of claim 7 and clamps on said ring for supporting said band whereby the orientation of said band may be changed to correspond to the location of the user on the surface of the earth.

5. The hollow sphere of claim 7 in which the spots are on the inner surface of the sphere and reflect light when they are illuminated from said means within said sphere.

6. The hollow sphere of claim 7 with latitudinal degrees and notations identifying celestial objects depicted on the outer surface.

7. The hollow sphere of claim 1 and an opening through which said illuminating means may be inserted into or removed from the sphere.

8. The hollow sphere of claim 7 and a cover for said opening which provides a continuous surface on which the rollers may be supported.

9. The hollow sphere of claim 1 wherein the transparent sphere has an inner surface with a non-glare characteristic, the spots being formed on the inner surface of the sphere and reflecting light when they are illuminated from said means within said sphere.

10. A hollow transparent sphere, having spots dispersed over the surface of the sphere, the transparent sphere having an inner surface with a non-glare characteristic, the spots being formed on the inner surface of the sphere and reflecting light when they are illuminated from within, said spots being arranged on said surface to depict stars and constellations at the positions which they actually occupy in the sky; means inside said sphere for illuminating the surface of the sphere, said illuminating means including a removable, battery powdred light source having supported rollers with an upwardly directed reflector so that said illuminating means rolls under gravity to the lowest point on the sphere, said spots reflecting the light of said illuminating means; and a ring encircling at least part of the circumference of the sphere, said ring being secured to the sphere at its north and south poles and a band perpendicular to the ring and encircling the sphere at a location corresponding to the earth's equator to provide a surface which may be marked with orienting indicia.

* * * * *